(12) United States Patent
Allen

(10) Patent No.: US 7,237,397 B2
(45) Date of Patent: Jul. 3, 2007

(54) VEHICLE WITH AIR CONDITIONING ARRANGEMENT

(75) Inventor: Kendall E. Allen, Ruther Glen, VA (US)

(73) Assignee: Dometic Environmental Corporation, Pompano Beach, FL (US)

(*) Notice: Subject to any disclaimer, the term of this patent is extended or adjusted under 35 U.S.C. 154(b) by 164 days.

(21) Appl. No.: 11/049,045

(22) Filed: Feb. 2, 2005

(65) Prior Publication Data

US 2005/0198986 A1 Sep. 15, 2005

Related U.S. Application Data

(60) Provisional application No. 60/551,706, filed on Mar. 10, 2004.

(51) Int. Cl.
*B60H 1/32* (2006.01)

(52) U.S. Cl. .......................... 62/236; 62/244

(58) Field of Classification Search .................. 62/236, 62/244; 165/42–43
See application file for complete search history.

(56) References Cited

U.S. PATENT DOCUMENTS

| | | | |
|---|---|---|---|
| 1,833,607 A | 11/1931 | Dennedy | |
| 2,975,614 A | 3/1961 | McGuffey | |
| 4,051,691 A * | 10/1977 | Dawkins | 62/236 |
| 4,674,294 A | 6/1987 | D'Agaro | |
| 4,720,980 A * | 1/1988 | Howland | 62/81 |
| 4,762,170 A | 8/1988 | Nijjar et al. | |
| 4,825,663 A | 5/1989 | Nijjar et al. | |
| 4,945,977 A | 8/1990 | D'Agaro | |
| 4,947,657 A | 8/1990 | Kalmbach | |
| 5,056,330 A | 10/1991 | Isobe et al. | |
| 5,275,017 A | 1/1994 | Thomas | |
| 5,333,678 A | 8/1994 | Mellum et al. | |
| 5,899,081 A | 5/1999 | Evans et al. | |
| 6,681,588 B2 * | 1/2004 | Zeigler | 62/239 |
| 6,932,148 B1 * | 8/2005 | Brummett et al. | 165/43 |
| 7,043,931 B2 * | 5/2006 | Plummer | 62/236 |

\* cited by examiner

*Primary Examiner*—William E. Tapolcai
(74) *Attorney, Agent, or Firm*—Pearne & Gordon LLP

(57) ABSTRACT

Vehicles include a first air conditioning system adapted to condition at least air in the driver compartment. The first air conditioning system has a condenser coil, a condenser fan, an evaporator coil, an evaporator fan and a compressor. The vehicles also have a second air conditioning system adapted to condition at least air in the sleeper compartment. The second air conditioning system has an auxiliary condenser coil, an auxiliary condenser fan, an auxiliary evaporator coil, an auxiliary evaporator fan and an auxiliary compressor. The auxiliary condenser fan can be provided as an auxiliary direct current condenser fan, an auxiliary axial condenser fan or an auxiliary direct current axial condenser fan.

17 Claims, 5 Drawing Sheets

VEHICLE WITH AIR CONDITIONING ARRANGEMENT

CROSS-REFERENCE TO RELATED APPLICATIONS

This application claims the benefit of U.S. Provisional Application No. 60/551,706 filed on Mar. 10, 2004, which is entirely incorporated herein by reference.

FIELD OF THE INVENTION

The present invention is directed in general to a heating, ventilating, and air conditioning (HVAC) systems, and is particularly directed to air conditioning systems for a vehicle.

BACKGROUND OF THE INVENTION

Motor vehicles, such as a long distance or over the road trucks may not be configured to readily provide HVAC needs when parked. Specifically, such vehicles may not provide for a desired HVAC when the vehicles are not being driven. For example, if the vehicle is parked and HVAC is desired, the engine of the vehicle, which drives an associated engine driven air-conditioning unit heat exchanger, etc., may need to be operated. This results in air pollution, sound pollution, and engine wear concerns. As such, there is some need to address issues concerning HVAC needs when the vehicle is stationary.

Reconfiguring a vehicle to include additional HVAC equipment may be labor intensive and may require cutting, fitting, or other modification of existing parts. Space constraints within the vehicle may also be problematic.

SUMMARY OF THE INVENTION

In accordance with one aspect, the present invention provides a vehicle with an interior area including a driver compartment and a sleeper compartment and a first air conditioning system adapted to condition at least air in the driver compartment. The first air conditioning system comprises a condenser coil, a condenser fan, an evaporator coil, an evaporator fan and a compressor. The vehicle further includes a ground-engaging wheel and a power source adapted to power the first air conditioning system and the ground-engaging wheel. The vehicle further comprises a second air conditioning system adapted to condition at least air in the sleeper compartment. The second air conditioning system comprises an auxiliary condenser coil, an auxiliary axial condenser fan, an auxiliary evaporator coil, an auxiliary evaporator fan and an auxiliary compressor.

In accordance with another aspect, the present invention provides a vehicle with an interior area including a driver compartment and a sleeper compartment and a first air conditioning system adapted to condition at least air in the driver compartment. The first air conditioning system includes a condenser coil, a condenser fan, an evaporator coil, an evaporator fan and a compressor. The vehicle further comprises a ground-engaging wheel and a power source adapted to power the first air conditioning system and the ground-engaging wheel. The vehicle further includes a second air conditioning system adapted to condition at least air in the sleeper compartment. The second air conditioning system includes an auxiliary condenser coil, an auxiliary direct current condenser fan, an auxiliary evaporator coil, an auxiliary evaporator fan and an auxiliary compressor.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DETAILED DESCRIPTION OF EXAMPLE EMBODIMENTS

Figure 1:
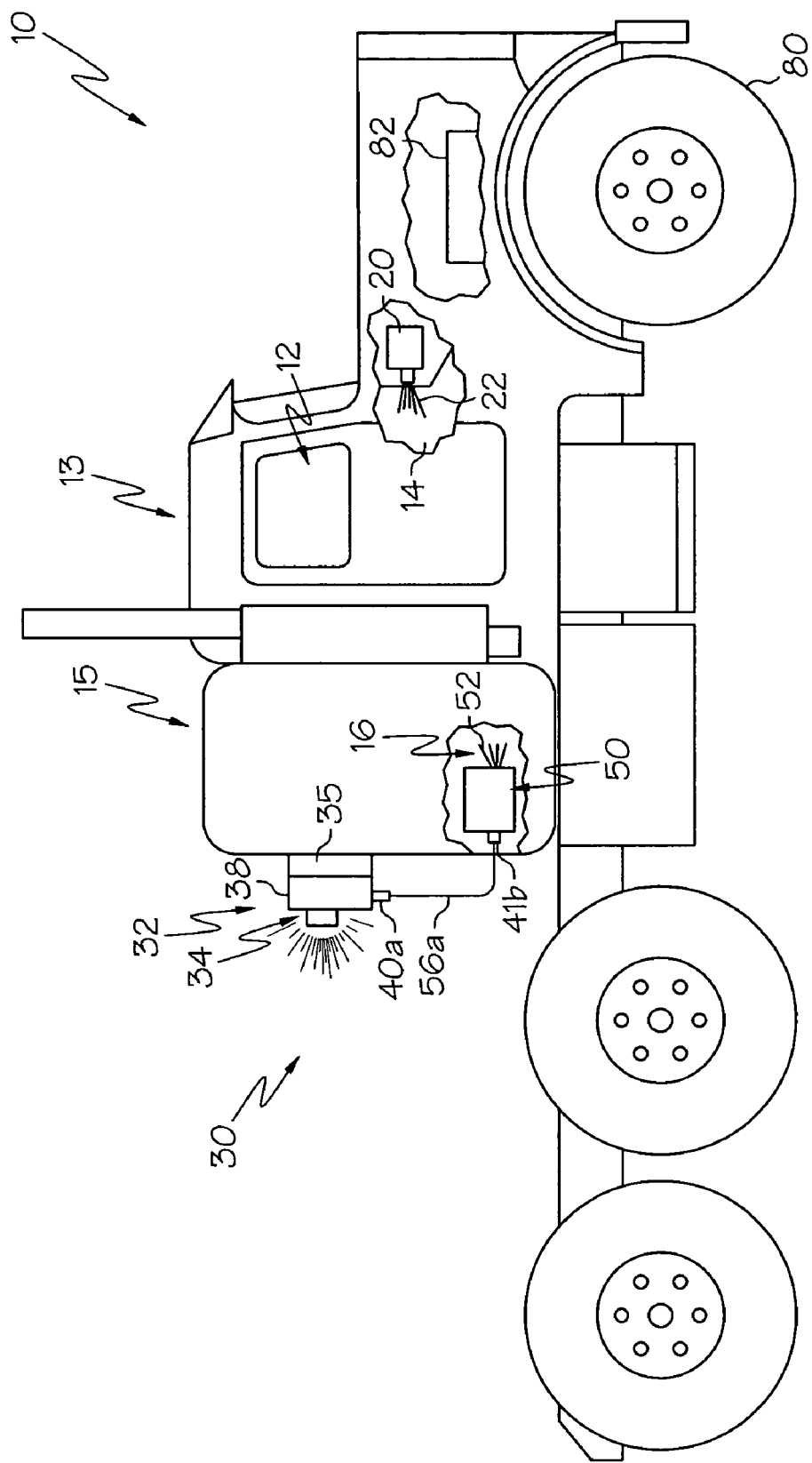
FIG. 1 is an elevational view of a truck with portions broken away to depict features of the present invention and including a first air conditioning system and a second air conditioning system in accordance with a first example embodiment of the present invention.

Certain terminology is used herein for convenience only and is not to be taken as a limitation on the present invention. Further, in the drawings, the same reference numerals are employed for designating the same elements, and in order to clearly and concisely illustrate the present invention, certain features may be shown in somewhat schematic form. Features of the present invention may be incorporated in a wide variety of applications and may be used with the concepts disclosed in U.S. patent application Ser. No. 10/927,937, filed Aug. 27, 2004, which is entirely herein incorporated by reference.

FIG. 1 depicts a vehicle 10 with portions broken away to depict features of an example embodiment of the present invention. The vehicle 10 includes interior compartments that might accommodate air conditioning systems, such as distinct air conditioning systems. As shown, the vehicle 10 includes an interior area 12 with a driver compartment 14 and a sleeper compartment 16. In particular embodiments, the vehicle 10 might comprise a truck with a driver cab 13 including the driver compartment 14 and a sleeper cab 15 including the sleeper compartment 16. A wide range of vehicles, in addition to trucks, might comprise driver and sleeper compartments. For example, a vehicle might comprise a recreational vehicle wherein the driver compartment comprises the front seat area of the recreational vehicle and the sleeper compartment comprises a rear living area of the recreational vehicle. Vehicles might also comprise an automobile, such as a van, where the driver compartment comprises the front seat area and the sleeper compartment comprises a rear seat or rear area of the automobile. Other vehicles including a driver compartment and one or more additional sleeper compartments might also incorporate concepts of the present invention. It is to be appreciated that the phrase "sleeper compartment" is to be interpreted as a compartment that a person may occupy to sleep, rest, or otherwise occupy when not in the driver compartment.

The shown embodiments of the present invention include a first air conditioning system 20 adapted to provide conditioned air 22 to at least the driver compartment 14 and a second air conditioning system 30 adapted to provide conditioned air 52 at least to the sleeper compartment 16. In certain embodiments, the driver compartment 14 is segregated from the sleeper compartment 16. For example, the compartments might be independent compartments that are permanently segregated from one another, or might comprise compartments or rooms that are selectively segregated from one another with a closure, such as doors, drapes, or the like. In embodiments where the driver compartment 14 is segregated from the sleeper compartment 16, the first air conditioning system 20 might only or substantially be adapted to condition air in the driver compartment 14 and the second air conditioning system 30 might only or substantially be adapted to condition air in the sleeper compartment 16. In other examples, the first air conditioning system 20 and the second air conditioning system 30 might have the ability to condition air in the driver and sleeper compartments. For instance, in the absence of segregation between the driver compartment 14 and sleeper compartment 16, conditioned air 22 may diffuse or pass into the sleeper compartment 16 or there might be significant heat transfer between the sleeper compartment 16 and driver compartment 14. Similarly, in the absence of segregation between the driver compartment 14 and sleeper compartment 16, conditioned air 52 may diffuse or pass into the driver compartment 14 or there might be significant heat transfer between the sleeper compartment 16 and driver compartment 14.

Figure 4:
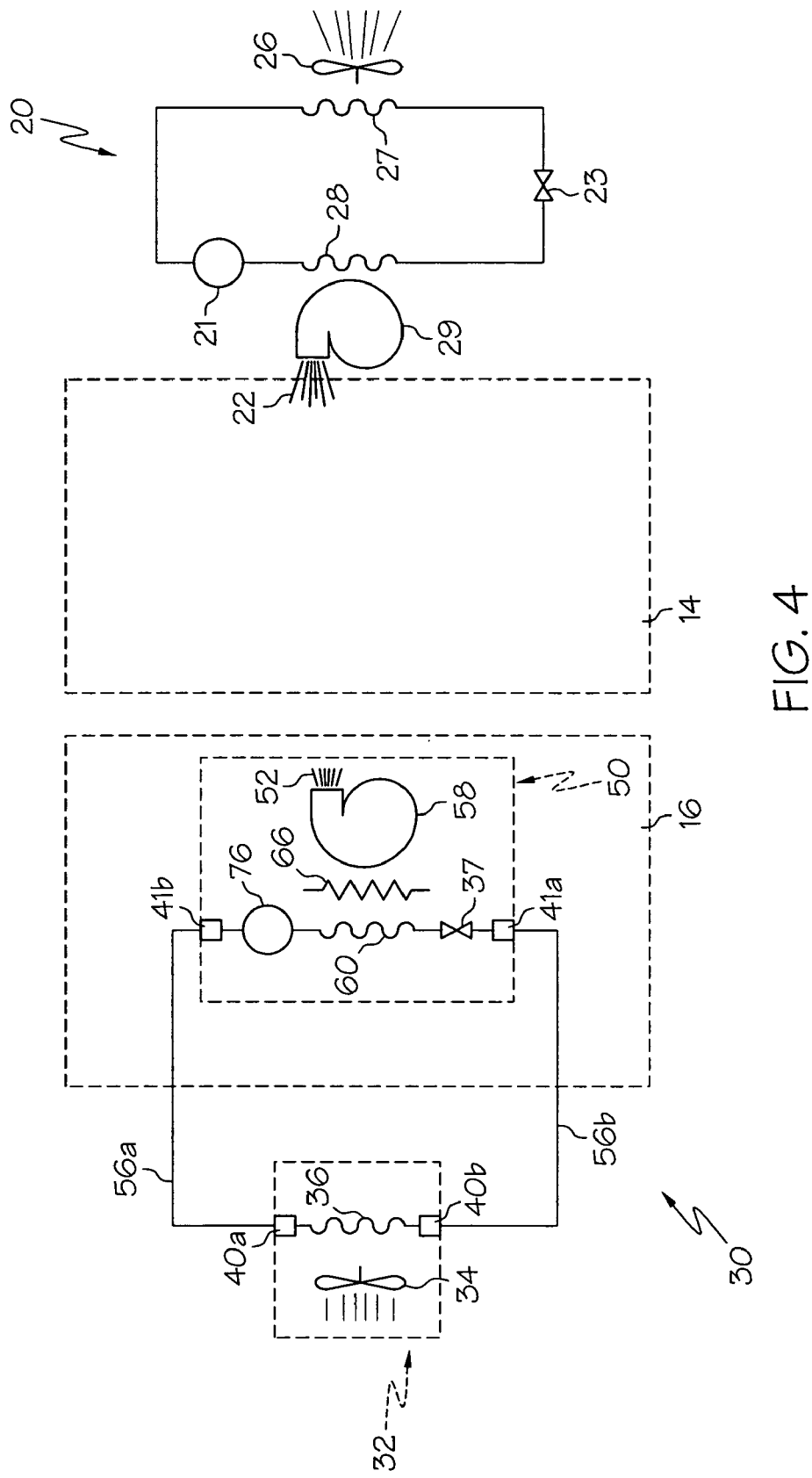
FIG. 4 is a schematic illustration of the first and second air conditioning system of FIG. 1.

The first air conditioning system 20 can comprise a wide variety of systems. For example, as shown in FIGS. 1 and 4, the first air conditioning system 20 might include a compressor 21, a condenser coil 27, a condenser fan 26, an evaporator coil 28 and an evaporator fan 29. Air conditioning units described throughout the application can also include a separate expansion device. For example, the illustrated first air conditioning system 20 can further include an expansion device 23. Expansion devices throughout this application can comprise an expansion valve, expansion capillary tube or the like. While the illustrated embodiments throughout the application schematically depict the expansion device separately from the corresponding evaporator coil, it is contemplated that the corresponding evaporator coil might incorporate the expansion device or incorporate the functionality of the expansion device.

The vehicle further includes a power source adapted to power a ground engaging wheel and the first air conditioning system. For example, as apparent in partial schematic layout in FIG. 1, the example vehicle 10 includes several ground engaging wheels 80 and a power source 82 adapted to power the first air conditioning system 20 at least one, but possibly multiple, ground engaging wheels 80.

The power source 82 can comprise a combustion engine, electric motor, or the like. In one example, a battery provides direct power to the first air conditioning system 20 and the power source 82 recharges the battery such that the power source 82 indirectly provides power to the first air conditioning system 20. Fuel, such as electricity or combustible fuel or the like may be used to operate the power source 82. In a parked condition, the power source 82 is not needed to power the ground engaging wheels 80. However, if conditioned air is to be provided by the first air conditioning system, the power source 82 must remain in operation for directly powering the first air conditioning system 20 and/or continued charging of the battery for indirectly powering the first air conditioning system 20. For example, the power source 82 may be needed to recharge a battery that directly powers the first air conditioning system 20. In certain applications however, idle running of a power source when the vehicle is parked can cause excessive wear and tear, require undue fuel consumption, and/or present an environmental concern.

In order to provide comfort in the sleeper compartment 16, a second air conditioning system 30 is provided that might not rely on the power source 82 for power. Therefore, air in the sleeper compartment 16 might be conditioned without running the power source 82 used to power the ground engaging wheels 80.

As shown in schematic form in FIGS. 1 and 4, the second air conditioning system 30 can be distinct from the first air conditioning system 20 in that the air conditioning systems can include separate refrigeration circuits. Therefore, in example embodiments, the refrigeration circuit of the first air conditioning system 20 may not be necessary to operate the second air conditioning system 30. Providing distinct air conditioning systems simplifies retrofit of existing vehicles to add a second air conditioning system for conditioning air at least in a sleeper compartment of the vehicle. It is also contemplated that concepts of the present invention might be practiced with first and second air conditioning systems that are not distinct from one another. For example, air conditioning systems may share a refrigerant circuit to allow the second air conditioning system to function without an additional energy source.

The second air conditioning system 30 is also adapted to operate independently of the first air conditioning system 20. Therefore, in example embodiments, the second air conditioning system 30 can function without any input or assistance from the first air conditioning system 20. Independent operation allows use of one air conditioning system without operating the other air conditioning system, thereby reducing power consumption and wear of components. Still further, air conditioning systems might be dependent from one another in additional applications. For example, the first and second air conditioning systems can include at least one common component to reduce the number of overall system components.

Figure 5:
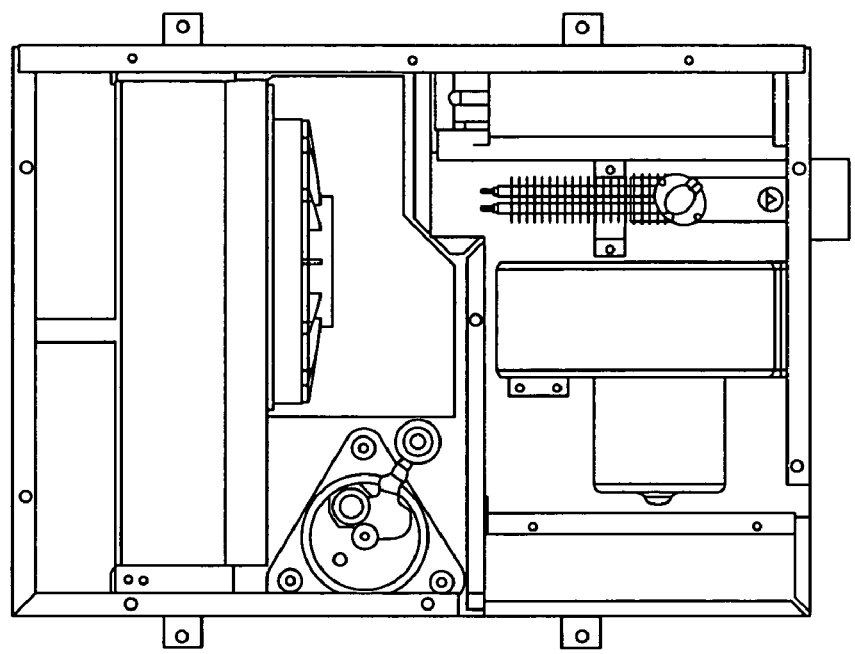
FIG. 5 is a upper plan view of portions of a second air conditioning system in accordance with another embodiment of the present invention.
Figure 6:
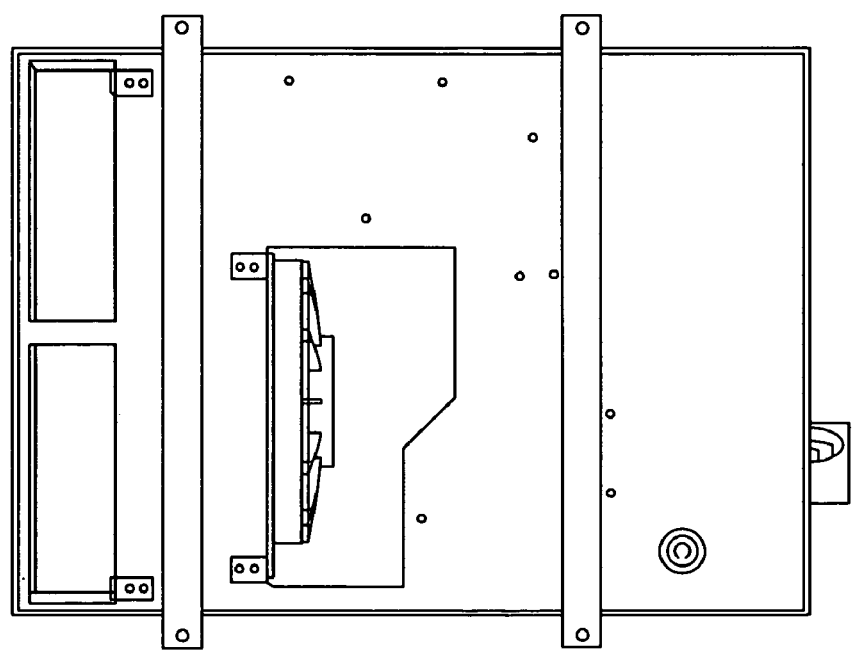
FIG. 6 is a lower plan view of portions of the second air conditioning system of FIG. 5.

The second air conditioning system can comprise a plurality of assemblies as illustrated in FIGS. 1-4 or as a single assembly as illustrated in FIGS. 5 and 6. For example, as shown in FIG. 1, the second air conditioning system 30 can include an exterior assembly 32 and an interior assembly 50. The exterior assembly 32 can be mounted to a location outside the interior area 12 of the vehicle 10. For example, as shown in FIG. 1, the exterior assembly 32 can be mounted to a rear side of the sleeper cab 15. Although not shown, the exterior assembly 32 might be mounted to another side surface, a top surface or a bottom surface of the sleeper cab 15 or might be mounted at another location outside the interior area 12 of the vehicle 10.

Figure 2:
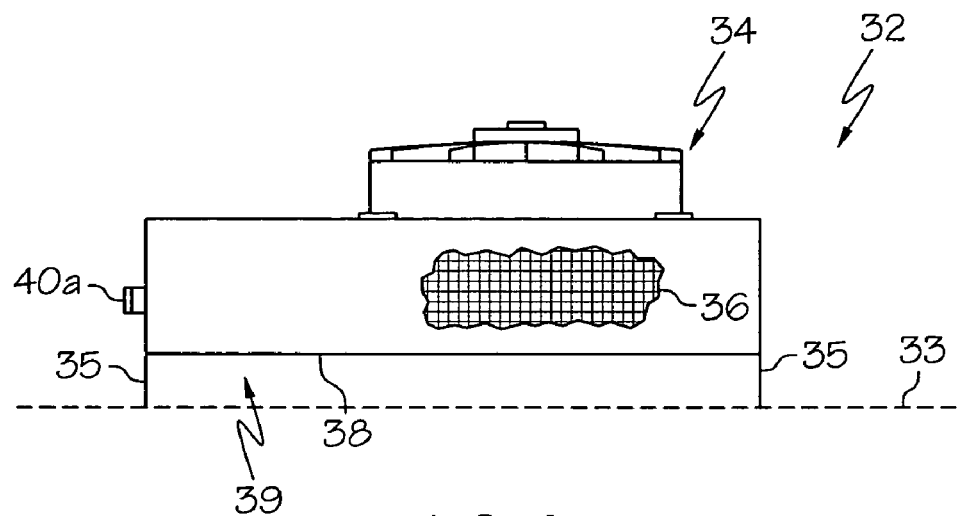
FIG. 2 is an elevational view of an exterior assembly of the second air conditioning system of FIG. 1.

As shown in FIGS. 2 and 4, the exterior assembly 32 comprises an auxiliary condenser coil 36 and an auxiliary condenser fan 34. The auxiliary condenser coil 36 may be positioned within an interior area of a housing 38. A portion of the housing 38 is broken away in FIG. 2 to illustrate the auxiliary condenser coil 36 located within the housing. One or more offset brackets 35 may be provided to mount the auxiliary condenser coil 36 and auxiliary condenser fan 34 to a support surface 33 while offsetting the auxiliary condenser coil 36 from the support surface 33. Offsetting the auxiliary condenser coil 36 from the support surface 33 provides an offset space 39 that permits circulation of air between the auxiliary condenser coil 36 and the support surface 33.

The interior area of a vehicle is often limited and it is often desired to reduce components within the interior area to enlarge the available space within the vehicle. Accordingly, locating the auxiliary condenser coil 36 and the auxiliary condenser fan 34 outside the interior area 12, reduces interior area required to house the second air conditioning system. Therefore, a second air conditioning system might be installed in applications where the limited interior area available would otherwise prohibit installation of a secondary air conditioning system. Reducing the interior space requirements also frees additional interior space for other vehicle components that might not otherwise be installed due to excessive space requirements of a second air conditioning system provided as a single assembly mounted entirely within the interior area of the vehicle. Still further, a condenser fan can present a significant noise concern for the driver and other vehicle occupants. Therefore, locating the auxiliary condenser fan 34 outside the interior area 12 can significantly reduce the noise pollution within the interior area 12 of the vehicle.

Figure 3:
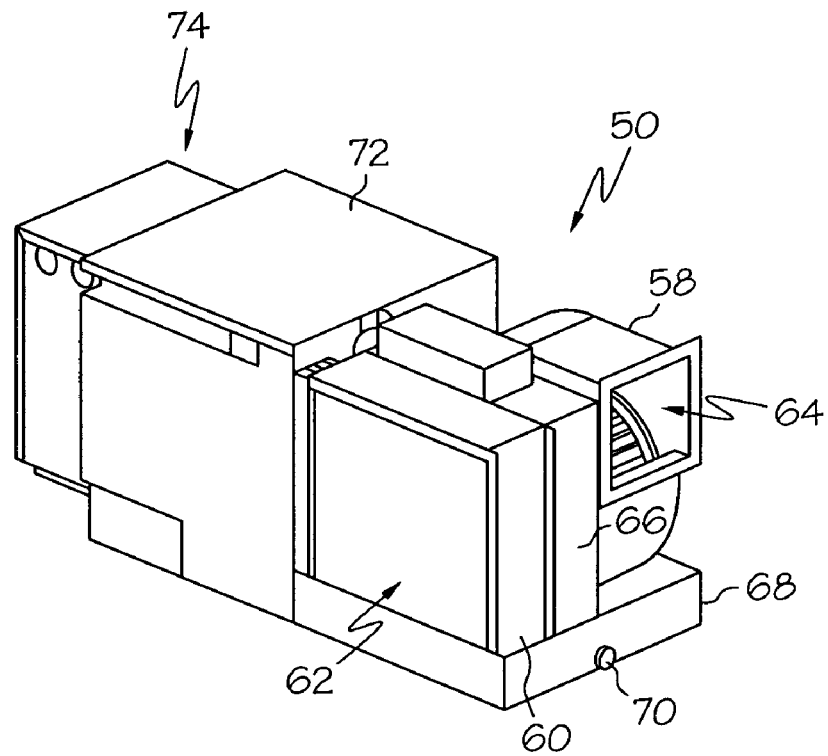
FIG. 3 is a perspective view of the interior assembly of the second air conditioning system of FIG. 1.

The interior assembly 50 can be mounted within driver compartment 14 or the sleeper compartment 16 of the interior area 12 of the vehicle 10. In one particular embodiment, the interior assembly 50 might be mounted underneath a bed located in the sleeper compartment 16. A perspective view of an interior assembly 50 is shown in FIG. 3 and certain elements of the interior assembly 50 are shown in schematic form in FIG. 4. The interior assembly 50 includes an auxiliary compressor 76, an auxiliary evaporator coil 60 and an auxiliary evaporator fan 58. The evaporator fan 58 is designed to draw air through an inlet 62 and disperse conditioned air 52 through an outlet 64. An expansion device 37 such as an expansion valve, expansion capillary tube or the like can also be provided. The expansion device 37 can be considered part of the auxiliary evaporator coil 60.

In certain embodiments, it can also be beneficial to provide the auxiliary evaporator coil 60, the auxiliary evaporator fan 58 and the compressor 76 as part of the interior assembly 50 to prevent an oversized exterior assembly. Indeed, including the evaporator coil 60, the evaporator fan 58 or the compressor 76 as part of the exterior assembly may result in an oversized exterior assembly that can not be incorporated in certain vehicle applications. In order to apply the second air conditioning system to a wide variety of vehicle applications, it can be important not to oversize the exterior assembly. Oversized exterior assemblies may present various installation obstacles and can increase air resistance of the vehicle. For example, an oversized exterior assembly may not fit underneath the lower wall of a sleeper cab 15. Locating an oversized exterior assembly on the roof of the sleeper cab 15 may increase the overall height of the truck above a maximum regulated height and can increase the air resistance of the vehicle. Moreover, it may not be possible to locate an oversized exterior assembly behind the sleeper cab 15 due to interference with other portions of the vehicle (e.g., a truck trailer).

Figure 7:
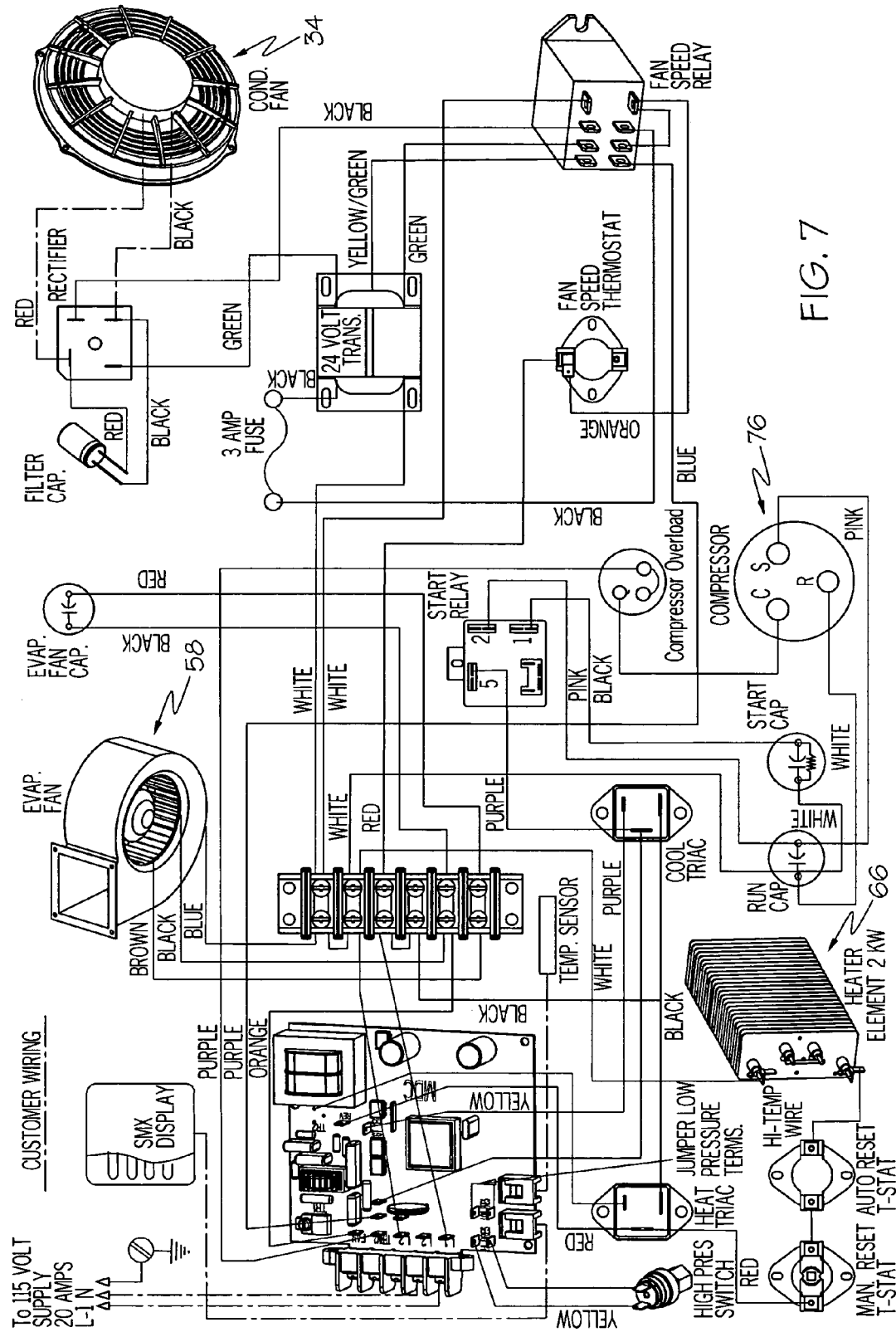
FIG. 7 is a schematic illustration of an example wiring diagram of second air conditioning systems in accordance with the present invention.

The interior assembly 50 can further comprise an optional heating element 66, such as an electric heater, to allow the second air conditioning system 30 to provide heat without requiring waste heat from the power source 82. As shown in FIG. 3, a compressor housing 72 might be provided to protect the compressor and other components of the interior assembly 50. An electric box 74 may also be provided to house certain electrical components of the second air conditioning system 30. The electric box 74 may be attached to other components of the second air conditioning system 30, such as the compressor housing 72. Alternatively, the electric box 74 might be mounted at an alternative location away from other components of the second air conditioning system 30. A schematic illustration of an example wiring diagram of components of the second air conditioning system is illustrated in FIG. 7. As further shown in FIG. 3, the interior assembly 50 can include a drip pan 68 with a drain 70 to collect and appropriately dispense condensed water from the evaporator coil 60.

In order to simplify installation, the interior and/or exterior assembly can comprise low loss quick connect inlet and outlet ports. A low loss quick connect port can comprise any joint, fitting or portion thereof that facilitates fluid connection and/or disconnection between two conduits without significant leakage of fluid to and/or from the conduits during the connection and/or disconnection process. As shown in FIG. 4, the exterior assembly 32 can comprise a first low loss quick connect inlet port 40*a* and a first low loss quick connect outlet port 40*b*. Similarly, the interior assembly 50 can comprise a second low loss quick connect inlet port 41*a* and a second low loss quick connect outlet port 41*b*.

A low loss quick connect line can also be used to operably connect the exterior assembly to the interior assembly. A low loss quick connect line can comprise any conduit adapted to connect with at least two fluid ports without significant leakage of fluid during connection and/or disconnection of the low loss quick connect line with the ports. For example, the second air conditioning system 30 can include a first low loss quick connect line 56*a* and a second low loss quick connect line 56*b* to operably connect the exterior assembly 32 to the interior assembly 50. The first low loss quick connect line 56*a* can operably connect the first low loss quick connect inlet port 40*a* of the exterior assembly 32 with the second low loss quick connect outlet port 41*b* of the interior assembly 50. Similarly, the second low loss quick connect line 56*b* can operably connect the second low loss quick connect inlet port 41*a* of the interior assembly 50 with the first low loss quick connect outlet port 40*b* of the exterior assembly 32.

In further embodiments, the first low loss quick connect line 56*a* and the second low loss quick connect line 56*b* can comprise a single overall line, the exterior assembly can comprise an overall port including both the low loss quick connect inlet and outlet ports of the exterior assembly, and the interior assembly can comprise an overall port including both the low loss quick connect inlet and outlet ports of the interior assembly. In one particular example embodiment, the single overall line can comprise a coaxial line with the first low loss quick connect line being coaxially aligned with the second quick connect line. Providing a single overall line may simplify operable connection of the interior assembly and the exterior assembly while minimizing the chance of potential refrigerant fluid loss. Indeed, a single overall line would only involve two connection steps, rather than four connection steps in applications where the first and second low loss quick connect lines are separate from one another.

Installation of the second air conditioning system 30 may be further simplified by providing the exterior and interior assembly as a kit with respective condenser and evaporator coils including precharged refrigerant fluid. Precharging the coils with refrigerant fluid reduces installation time and possible environmental spills during installation procedures. Prior to installation, the second air conditioning system may also be tested and optimized without requiring discharge of refrigerant material that might otherwise be necessary in applications that do not include precharged coils. Discharge of refrigerant material also requires additional preparation time and increases the likelihood of inadvertent leakage to the environment.

An example method of preparing an example air conditioning kit will now be described. An exterior assembly 32 is provided with a condenser fan 34 and a condenser coil 36. An interior assembly 50 is also provided with an evaporator fan 58, a compressor 76 and an evaporator coil 60. The condenser coil 36 and the evaporator coil 60 can then be independently or simultaneously charged with refrigerant fluid prior to operable connections of the interior and exterior assemblies. Alternatively, the exterior assembly 32 may be operably connected to the interior assembly 50 prior to charging the system with refrigerant fluid. Once operably connected, the evaporator coil 60 and the condenser coil 36 may be simultaneously charged with a single charging step. If desired, the second air conditioning system 30 may then be tested and optimized to obtain the desired specifications. The exterior assembly 32 and the interior assembly 50 may then be disconnected from one another while the respective condenser coil 36 and evaporator coil 60 remains charged. The use of low loss quick connect inlet and outlet ports and low loss quick connect lines may also further simplify providing a kit with precharged condenser and evaporator coils such that the precharged refrigerant fluid of the condenser coil is isolated from the precharged refrigerant fluid of the evaporator coil until subsequent operable connection of the exterior assembly with the interior assembly during installation procedures.

FIGS. 5 and 6 depict a second air conditioning system 130 including a single assembly in accordance with further embodiments of the present invention. The second air conditioning system 130 includes an auxiliary condenser fan 134 and an auxiliary condenser coil 136. The auxiliary condenser fan 134 is configured to draw air in through one or more inlet ports 142 to pass through the auxiliary condenser coil 136 and thereafter out through one or more air outlets 140. The second air conditioning system 130 further includes an auxiliary evaporator coil 160 and an auxiliary evaporator fan 158. The auxiliary evaporator fan 158 is configured to draw air through one or more inlet ports 162 to pass through the auxiliary evaporator coil 160 to produce conditioned air 152 through one or more air outlets 164. The second air conditioning system 130 also includes an auxiliary compressor 176 and can include an optional heating element 166 to enhance the functionality of the second air conditioning system.

Each component of the second air conditioning system 130 can be mounted together as a single assembly. For example, as shown, each component is mounted within a housing 138. FIG. 5 depicts perimeter portions of the housing 138 wherein the upper housing lid has been removed to reveal the components located in the interior of the housing 138. FIG. 6 depicts a lower portion of the housing 138 and further illustrates a drip pan 168 adapted to collect condensed liquid from evaporator coil 160. The drip pan 168 can be provided with a drain 170 adapted to permit condensed liquid in the drip pan to exit the housing 138. Accordingly, it will be appreciated that the single apparatus of the second air conditioning system 130 may reduce installation time by simply requiring three access openings to be cut in a wall of the interior area 12 to permit communication with the surrounding environment. For instance, three access openings may be cut in a lower wall of the sleeper compartment with the first opening in communication with the air inlets 142, the second opening in communication with the air outlets 140 and the third opening in communication with the drain 170 of the drip pan 168.

In accordance with aspects of the present invention, second air conditioning systems described throughout this application may include a wide variety of auxiliary condenser fans. In example embodiments, the second air conditioning system can include an auxiliary axial condenser fan to provide a compact fan design that reduces the overall size of the air conditioning assembly when compared to air conditioning assemblies including a centrifugal condenser fan. In additional example embodiments, the second air conditioning system can include an auxiliary direct current condenser fan to provide more airflow and consume less power than comparable alternating current condenser fans. In further example embodiments, the second air conditioning system can include an auxiliary direct current axial condenser fan, rather than an alternating current centrifugal condenser fan, to reduce the size of the assembly, enhance airflow, and reduce power requirements. As shown in FIG. 7, second air conditioning systems may include an AC-to-DC converter 42 in embodiments where the second air conditioning system operates on alternating current and includes an auxiliary direct current condenser fan.

From the above description of the invention, those skilled in the art will perceive improvements, changes and modifications. Such improvements, changes and modifications within the skill of the art are intended to be covered by the appended claims.

What is claimed:

1. A vehicle comprising:
an interior area including a driver compartment and a sleeper compartment;
a first air conditioning system adapted to condition at least air in the driver compartment and comprising a condenser coil, a condenser fan, an evaporator coil, an evaporator fan and a compressor;
a ground-engaging wheel;
a power source adapted to power the first air conditioning system and the ground-engaging wheel; and
a second air conditioning system adapted to condition at least air in the sleeper compartment and comprising an auxiliary condenser coil, an auxiliary axial condenser fan, an auxiliary evaporator coil, an auxiliary evaporator fan and an auxiliary compressor
wherein the second air conditioning system includes an exterior assembly mounted to a location outside the interior area, the exterior assembly comprising the auxiliary condenser coil and the auxiliary axial condenser fan, the second air conditioning system further including an interior assembly operably connected with the exterior assembly and mounted within the interior area, the interior assembly comprising the auxiliary evaporator coil, the auxiliary evaporator fan and the auxiliary compressor.

2. The vehicle of claim 1, wherein the second air conditioning system is distinct from the first air conditioning system and adapted to operate independently of the first air conditioning system.

3. The vehicle of claim 1, wherein the auxiliary axial condenser fan comprises a direct current axial condenser fan.

4. The vehicle of claim 3, further comprising an AC-to-DC converter for powering the direct current axial condenser fan.

5. The vehicle of claim 1, further comprising at least one low loss quick connect refrigerant line operably connecting the interior assembly and the exterior assembly.

6. The vehicle of claim 1, wherein the interior assembly and the exterior assembly each comprise at least one low loss quick connect port.

7. The vehicle of claim 1, comprising a truck.

8. The vehicle of claim 7, wherein the truck includes a driver cab and a sleeper cab connected to the driver cab.

9. The vehicle of claim 8, wherein the driver cab comprises the driver compartment and the sleeper cab comprises the sleeper compartment.

10. A vehicle comprising:
   an interior area including a driver compartment and a sleeper compartment;
   a first air conditioning system adapted to condition at least air in the driver compartment and comprising a condenser coil, a condenser fan, an evaporator coil, an evaporator fan and a compressor;
   a ground-engaging wheel;
   a power source adapted to power the first air conditioning system and the ground-engaging wheel; and
   a second air conditioning system adapted to condition at least air in the sleeper compartment and comprising an auxiliary condenser coil, an auxiliary direct current condenser fan, an auxiliary evaporator coil, an auxiliary evaporator fan and an auxiliary compressor
   wherein the second air conditioning system includes an exterior assembly mounted to a location outside the interior area, the exterior assembly comprising the auxiliary condenser coil and the auxiliary direct current condenser fan, the second air conditioning system further including an interior assembly operably connected with the exterior assembly and mounted within the interior area, the interior assembly comprising the auxiliary evaporator coil, the auxiliary evaporator fan and the auxiliary compressor.

11. The vehicle of claim 10, wherein the second air conditioning system is distinct from the first air conditioning system and adapted to operate independently of the first air conditioning system.

12. The vehicle of claim 10, further comprising an AC-to-DC converter for powering the auxiliary direct current condenser fan.

13. The vehicle of claim 10, further comprising at least one low loss quick connect refrigerant line operably connecting the interior assembly and the exterior assembly.

14. The vehicle of claim 10, wherein the interior assembly and the exterior assembly each comprise at least one low loss quick connect port.

15. The vehicle of claim 10, comprising a truck.

16. The vehicle of claim 15, wherein the truck includes a driver cab and a sleeper cab connected to the driver cab.

17. The vehicle of claim 16, wherein the driver cab comprises the driver compartment and the sleeper cab comprises the sleeper compartment.

* * * * *